(12) United States Patent
Dufaut et al.

(10) Patent No.: US 7,997,611 B2
(45) Date of Patent: Aug. 16, 2011

(54) SAFETY ARRANGEMENT IN A VEHICLE SEAT

(75) Inventors: Dominique Dufaut, Esbly (FR); Jean Le Guen, Laval (FR); Charles Haesaert, Fresnoy Folny (FR); Marc Philips, Burton upon trent (GB)

(73) Assignee: Autoliv Development AB, Vargarda (SE)

( * ) Notice: Subject to any disclaimer, the term of this patent is extended or adjusted under 35 U.S.C. 154(b) by 192 days.

(21) Appl. No.: 12/224,522

(22) PCT Filed: Mar. 8, 2007

(86) PCT No.: PCT/EP2007/002014
§ 371 (c)(1),
(2), (4) Date: Feb. 3, 2009

(87) PCT Pub. No.: WO2007/101689
PCT Pub. Date: Sep. 13, 2007

(65) Prior Publication Data
US 2009/0273166 A1  Nov. 5, 2009

(30) Foreign Application Priority Data
Mar. 8, 2006  (DE) .......................... 10 2006 011 105

(51) Int. Cl.
*B60R 21/207* (2006.01)
(52) U.S. Cl. .................................. 280/730.1; 280/743.1
(58) Field of Classification Search ............... 280/730.1, 280/743.1
See application file for complete search history.

(56) References Cited

U.S. PATENT DOCUMENTS

| 6,715,788 | B2 * | 4/2004 | Saiguchi et al. | 280/730.1 |
| 6,905,134 | B2 * | 6/2005 | Saiguchi et al. | 280/730.1 |
| 7,549,674 | B2 * | 6/2009 | Yoshikawa et al. | 280/740 |
| 7,648,161 | B2 * | 1/2010 | Kai | 280/730.2 |
| 7,708,306 | B2 * | 5/2010 | Yoshikawa et al. | 280/730.1 |
| 7,784,866 | B2 * | 8/2010 | Yoshikawa et al. | 297/216.1 |
| 7,789,417 | B2 * | 9/2010 | Yoshikawa et al. | 280/730.1 |
| 2003/0222490 | A1 | 12/2003 | Sakai | |

(Continued)

FOREIGN PATENT DOCUMENTS

DE  2913474 A1  10/1980

(Continued)

OTHER PUBLICATIONS

Office Action issued in counterpart proceedings before the Japanese Patent Office and the English language translation thereof.

*Primary Examiner* — Faye M. Fleming
*Assistant Examiner* — Drew Brown
(74) *Attorney, Agent, or Firm* — Harness, Dickey & Pierce, P.L.C.

(57) ABSTRACT

The invention relates to a safety device in a vehicle seat with a seat frame on which a seat cushion is fitted, and with an airbag unit with a gas generator and an airbag, which airbag unit is arranged on the seat frame below the seat cushion. It is the object of the invention to provide a safety device which effectively avoids the seat user slipping forwards in the event of an accident and at the same time is simple to produce and fit. The object is achieved in that the airbag when not activated rests in an unfolded and flat manner on the seat frame.

14 Claims, 13 Drawing Sheets

U.S. PATENT DOCUMENTS

Figure 1:
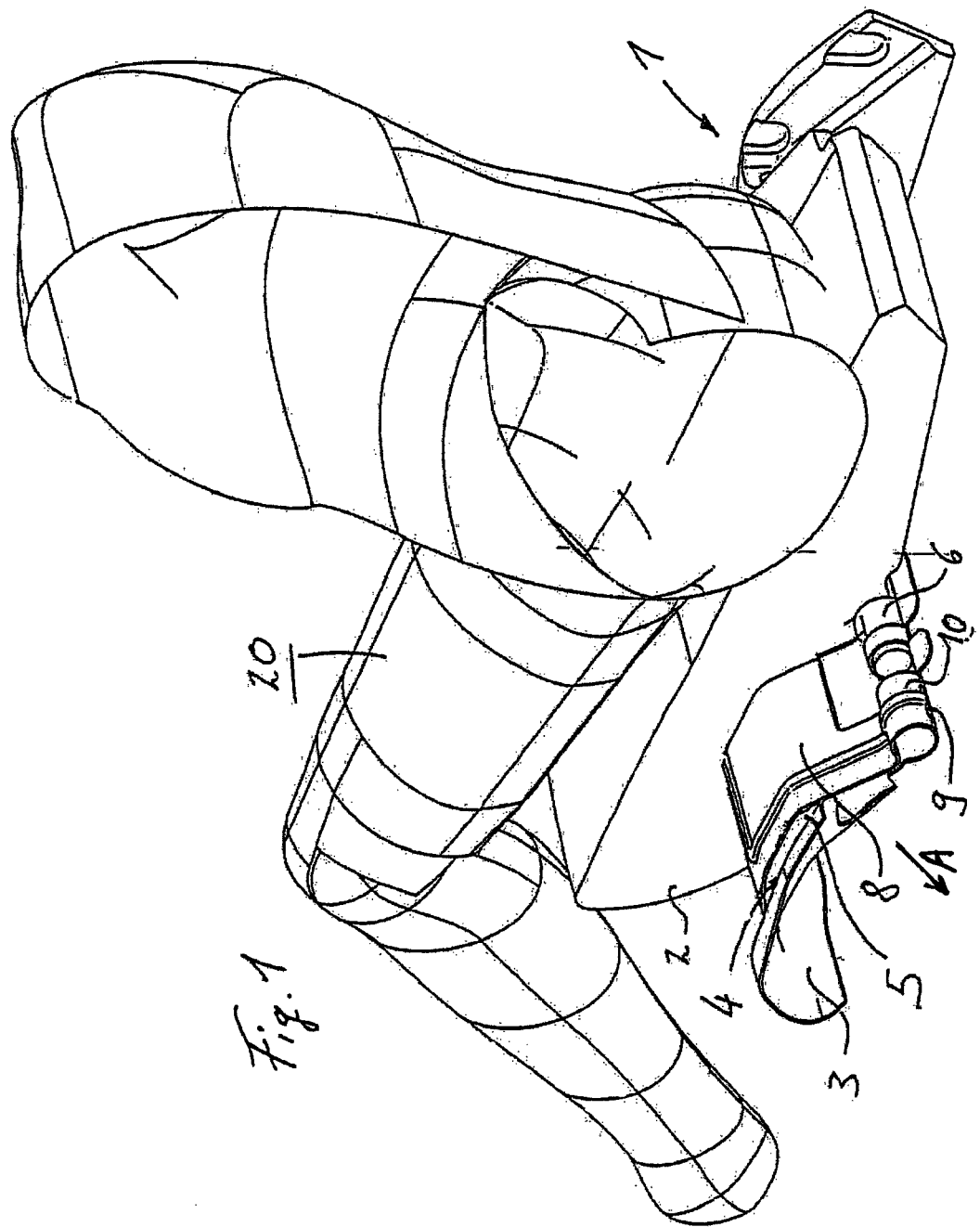

| | | |
|---|---|---|
| 2004/0155436 A1 | 8/2004 | Saiguchi et al. |
| 2004/0155446 A1 | 8/2004 | Saiguchi et al. |
| 2005/0184490 A1 | 8/2005 | Itoga et al. |
| 2006/0017266 A1* | 1/2006 | Yoshikawa et al. ......... 280/730.1 |
| 2007/0090633 A1* | 4/2007 | Hiruta et al. ............... 280/730.1 |
| 2007/0132214 A1* | 6/2007 | Suzuki et al. .............. 280/730.1 |
| 2008/0088119 A1* | 4/2008 | Murakami ................. 280/730.1 |
| 2009/0096198 A1* | 4/2009 | Yoshikawa et al. ......... 280/743.1 |

FOREIGN PATENT DOCUMENTS

| | | |
|---|---|---|
| EP | 1 369 315 A1 | 12/2003 |
| EP | 1566313 A1 | 8/2005 |
| GB | 2 412 092 A | 9/2005 |
| WO | WO-00/12350 A | 3/2000 |

* cited by examiner

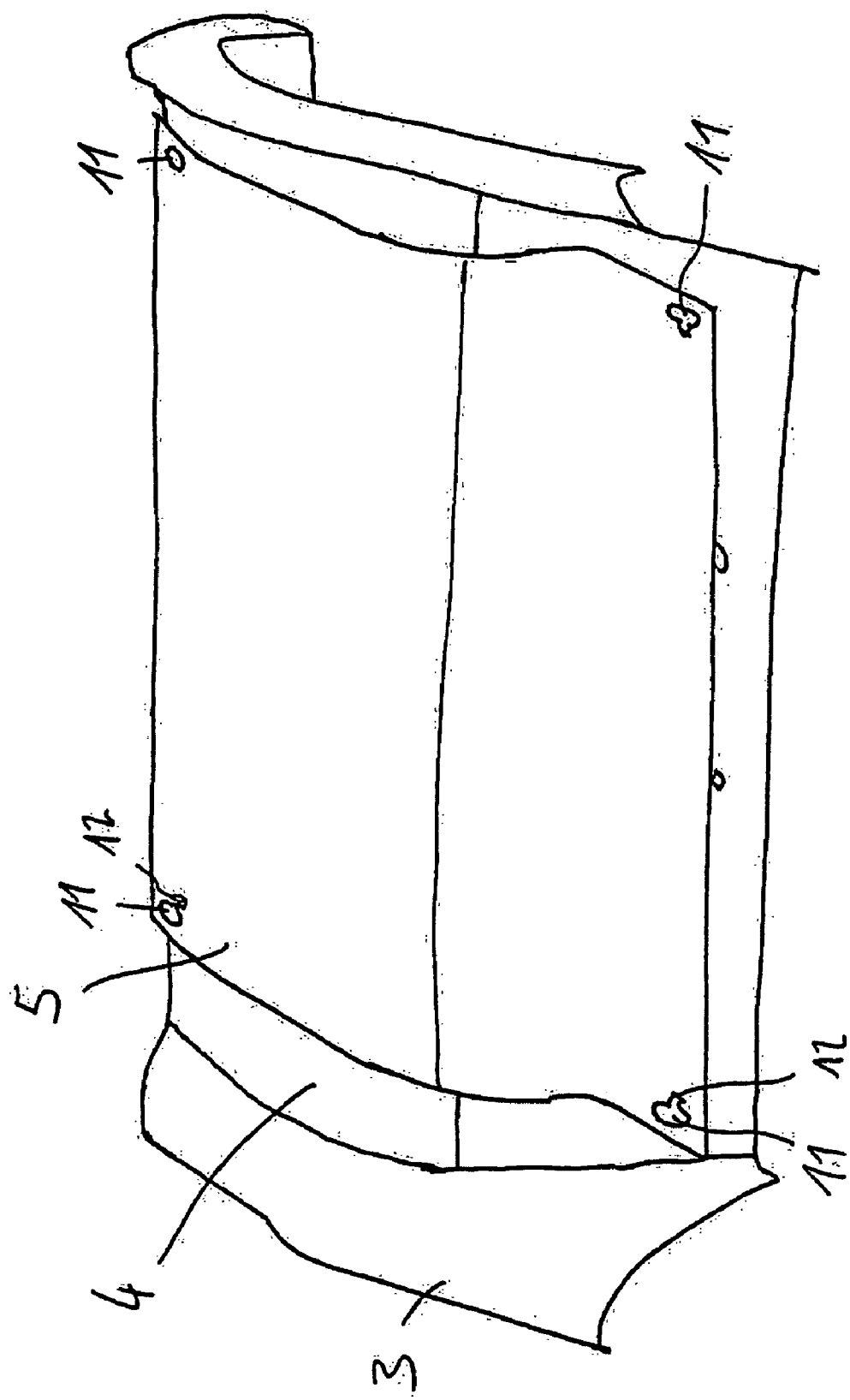

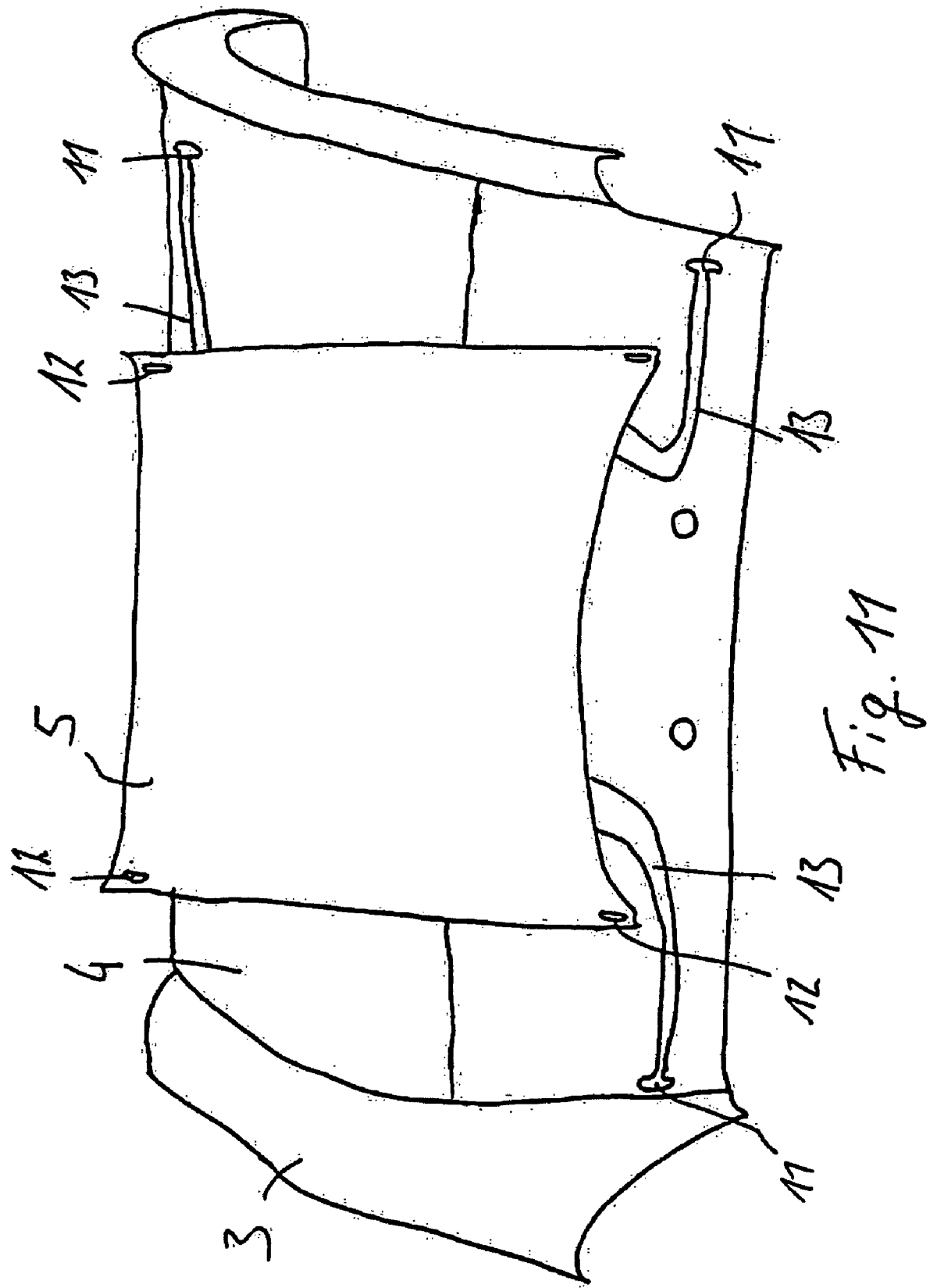

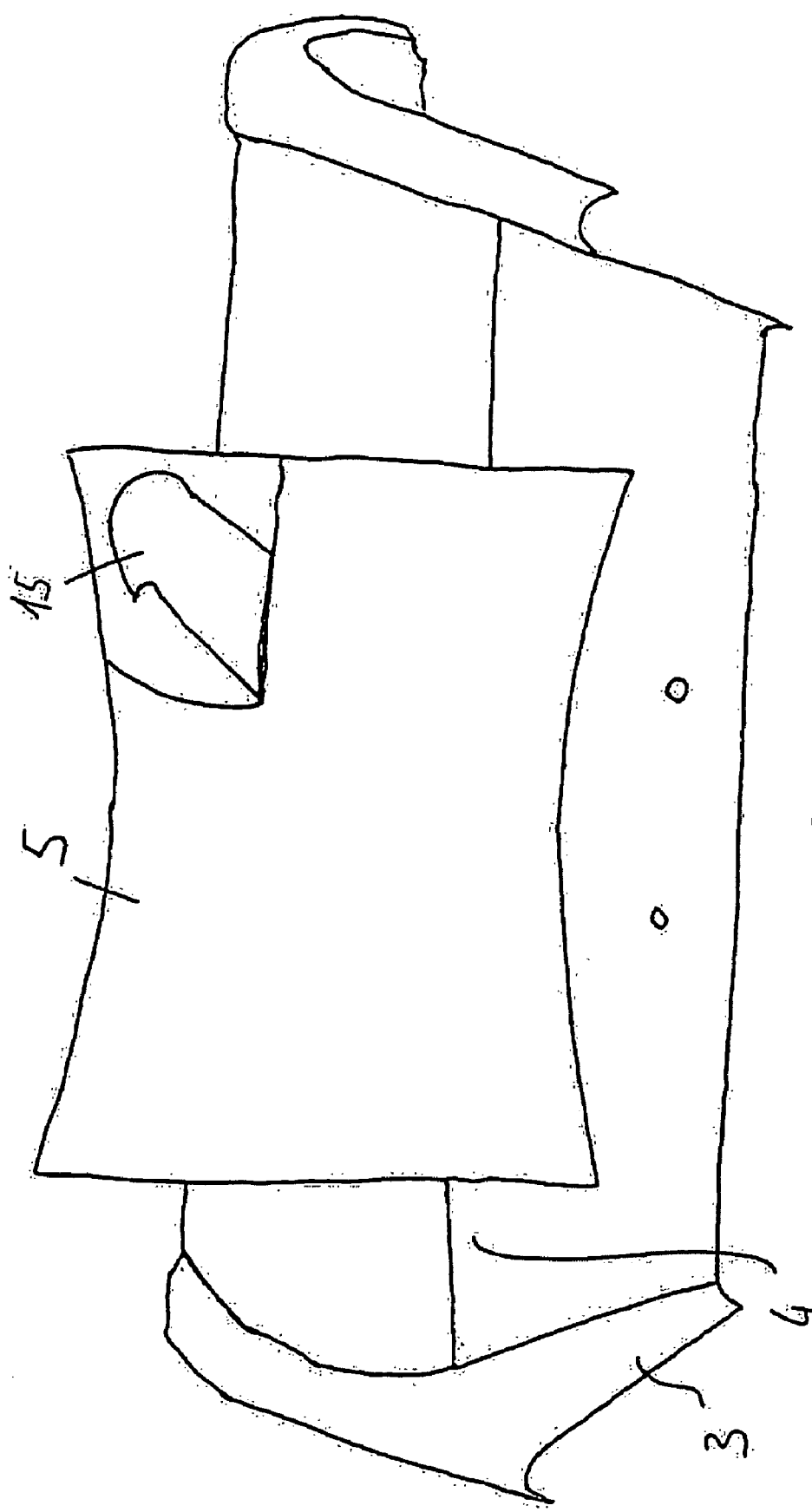

SAFETY ARRANGEMENT IN A VEHICLE SEAT

CROSS-REFERENCE TO RELATED APPLICATIONS

This application is a 371 U.S. National Stage of International Application No. PCT/EP2007/002014, filed Mar. 8, 2007. This application claims priority to German Patent Application No. 10 2006 011 105.2, filed Mar. 8, 2006, which application is herein expressly incorporated by reference.

The invention relates to a safety arrangement in a vehicle seat with a seat frame on which a seat cushion is attached and an airbag unit with a gas generator and a gas bag which are arranged on the seat frame below the seat cushion.

The safety of vehicle passengers during accidents is increased through a multiplicity of devices. So it is that in the event of an accident, gas bags or airbags before and next to the vehicle passenger are inflated. Furthermore, safety belts are provided which restrain the passenger during an accident. If applicable, these safety belts are equipped with belt tensioning devices in order to improve the restraining effect.

During a head-on collision a buckled-up vehicle user is exposed to the hazard that the lap of the seat user slides through under the lap belt so that the position of the seat user which is favourable from a technical safety point of view is vacated. This poses the danger that the remaining safety devices fail to become effective, e.g. in that the vehicle passenger does not plunge into the gas bag or that the vehicle passenger is injured on the shoulder belt. To counteract this danger and prevent the so-called "submarining" several solutions are known from the prior art. A solution consists in a very hard embodiment of the seat surface or the seat cushion so that submarining of the lap under the lap belt cannot occur. This is not acceptable because of the lack of comfort, more preferably on long distances.

From GB 2,412,092 A1 a vehicle seat with an airbag unit is known wherein a carrier plate is mounted in a seat frame. Within the carrier plane a folded airbag is stored in a vault. The folded airbag fills out this vault and together with the carrier plate forms a plane. During an accident, an associated gas generator is activated and fills the gas bag with gas. This causes a seat cushion to be raised and the "submarining" effect is reduced or eliminated.

GB 2,385,028 describes a safety arrangement that can be inflated with a unit that can be inflated of at least one pre-shaped plastically deformable element which, as part of a rim, forms a chamber that can be inflated. As soon as a gas generator is activated, a shoulder initially folded towards the inside is turned inside out. The element that can be inflated can be constructed of plastic or metal. A so-called lap restraint cushion forms an elevation substantially over the entire width in the front region of the seat cushion in order to minimise the risk of sliding forward.

The devices that can be inflated from the prior art must either be elaborately folded or pre-shaped which renders manufacture and assembly relatively complex and expensive.

The object of the present invention is to provide a safety device in a vehicle seat which effectively avoids a sliding forward of the seat user in the case of an accident and which is simple to assemble and manufacture at the same time.

According to the invention the object is solved through a safety device with the characteristics of Claim 1. Advantageous embodiments and further developments of the invention are described in the subclaims.

The safety device according to the invention in a vehicle with a seat frame, on which a seat cushion is attached, and an airbag unit with a gas generator and a gas bag which are arranged on the seat frame below the seat cushion provides that the gas bag in the non-activated state rests unfolded and flat on the seat frame or a support. The gas bag, which in the front region of the seat cushion formed flat rests on the seat frame below an upholstery, in the inflated state prevents the "submarining" of a seat user and reduces the displacement of the lap during an accident. Because of this, the lap can be effectively restrained by the seat belt system during an accident. In addition to this, a lesser load is exerted on the lap by the lap belt. Similarly, the loading of the lap by the seat is reduced when the lap is displaced forward. The unfolded arrangement of the gas bag results in a facilitation of the assembly and faster blowing-up of the gas bag as a result of which the reaction times can be reduced. In addition to this, the unfolded gas bag takes up less space and increases the freedom of design in the seat construction.

A further development of the invention provides that the seat frame has a plate-shaped support for the gas bag on which the latter rests. This plate-shaped support is preferably embodied inclined, ascendingly inclined in the direction towards the seat front edge in order to provide a passive element for supporting the "antisubmarining".

The gas generator is preferably mounted on the seat frame more preferably below the seat frame and is preferably located in the immediate vicinity of the gas bag mounted flat on the support or the seat frame. Because of this, a compact design and quick unfolding can be realised.

The gas generator is fastened to the seat frame or the plate-shaped support via fastening bolts, screws or the like, alternatively the gas generator can also be welded on.

A further development of the invention provides that a support plate covers at least one part of the gas bag in the non-activated state against the seat cushion in order to protect the gas bag from damages when the latter is mounted below the seat cushion. In this way it is prevented that the gas bag is damaged through the movements of the seat user on the seat cushion.

The support plate can be a part of the seat frame and formed of a plastic or sheet metal material. Here, the support plate is folded or laid down in the direction of the gas bag and can be fastened or arranged on the seat frame or on the bearing plate. With a one-piece embodiment of the support plate it is provided that there is a film hinge-like connection at the folding line. Alternatively it is possible that the support plate is mounted on the seat frame in an articulated manner, for example in that straps are introduced in recesses and are likewise bent over. Alternatively a separate joint or hinge can be provided which connects the support plate with the seat frame or the bearing plate.

The seat frame or the bearing plate can form a housing for the gas generator so that the gas generator can be merely introduced into this housing and via fastening devices, for example screws or fastening bolts, be fastened to the bearing plate or the seat frame. A preferred embodiment provides that the bearing plate is a separate component which simultaneously forms a housing for the gas generator, with a pre-attached gas bag which for example has holes on its circumference outside a circumferential seam and is hooked into hooks or the like and fastened. As a result, a modular embodiment of the bearing plate with gas generator and gas bag, if applicable with a formed or arranged support plate, would be possible, wherein the module merely has to be screwed or hooked into the seat frame and the gas generator connected with a suitable cabling in order to be able to provide an operational safety device.

The support plate, which is embodied as support for the ramp-like embodiment of the front region of the seat frame can be elastically preloaded in directions of the gas bag in order to keep the latter securely in place in the non-activated state. This can be effected through a spring, more preferably a torsion spring, which is preloaded in the direction of the gas bag so that the support plate rests on the flat gas bag like a lid.

The gas bag can comprise ventilation openings, preferably in slit form, in order to bring about controlled escaping of the unfolding gas provided by the gas generator. Similarly the support plate, which in the activated state of the gas bag rests on the latter, can comprise vent openings which are preferably arranged in a manner corresponding to the ventilation openings of the gas bag so that the support plate does not unreasonably obstruct the ventilation of the inflated gas bag.

Here, the gas bag preferably consists of a fabric which wholly or partly can be coated as a result of which the mass and the weight compared with the known unfolding bodies of metal or plastic can be reduced. At the same time, the height compared with customary devices is reduced.

The gas generator can be a compressed-air receiver or a pyrotechnical gas generator.

Figure 2:
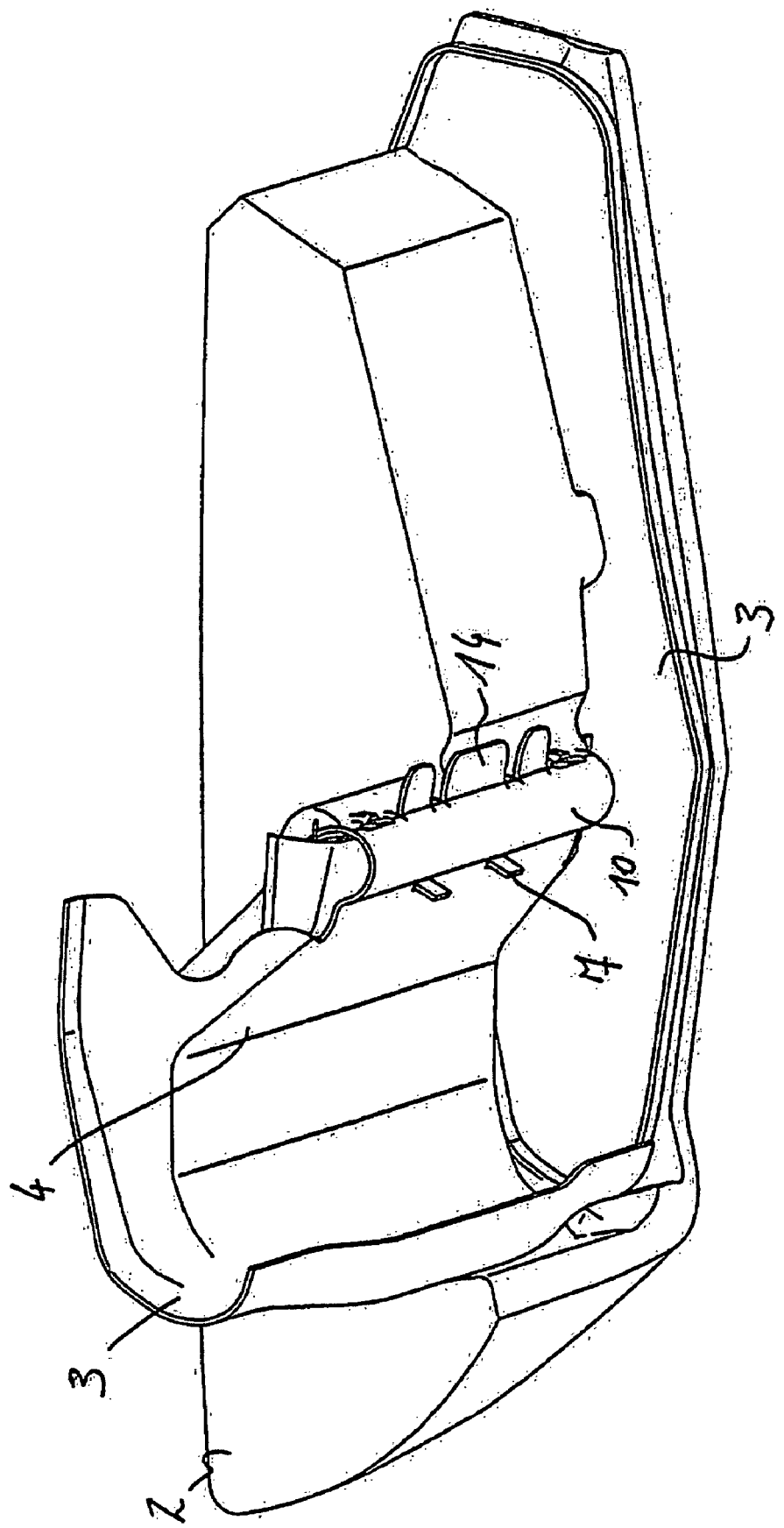
Figure 3:
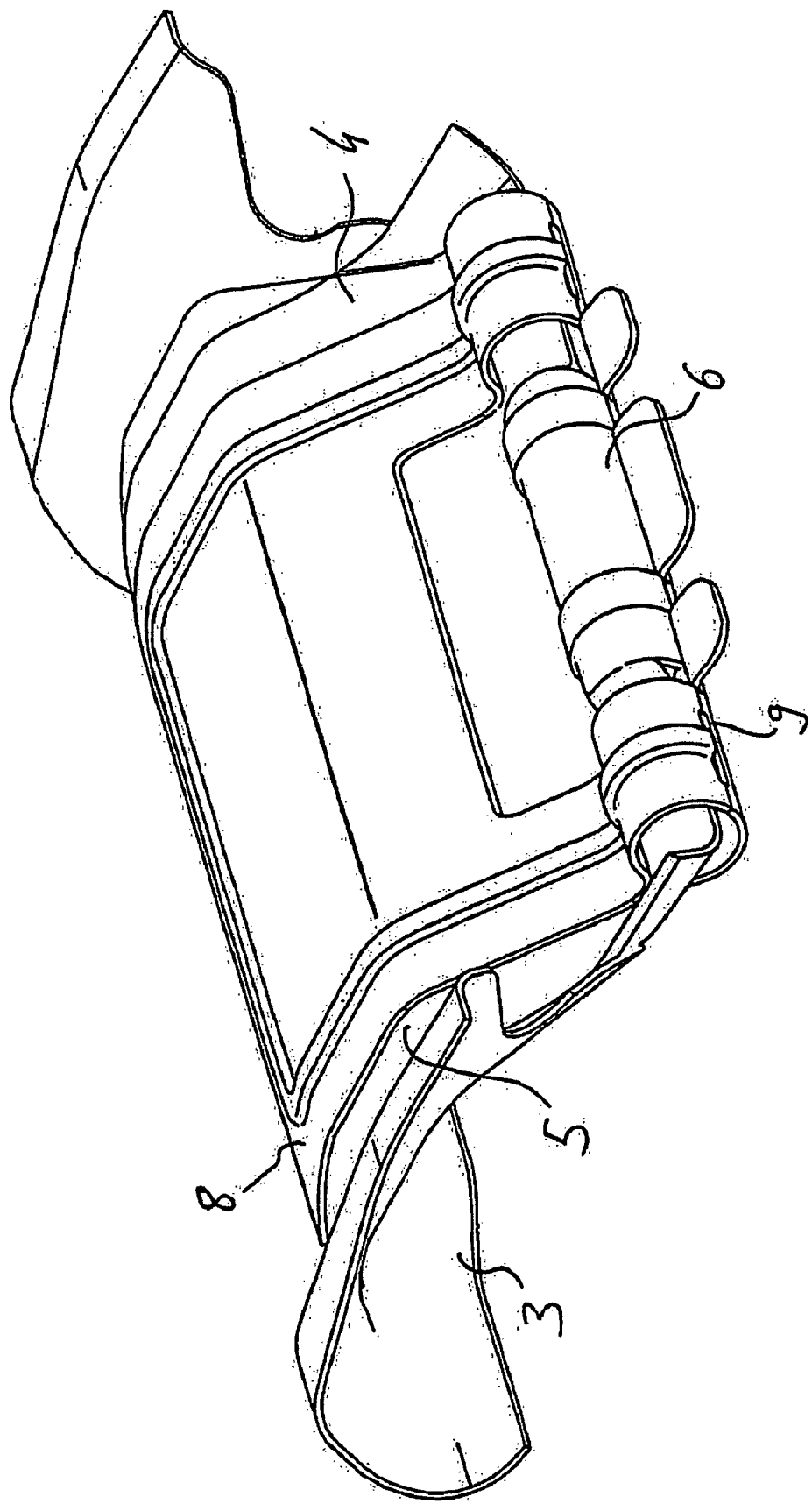
Figure 4:
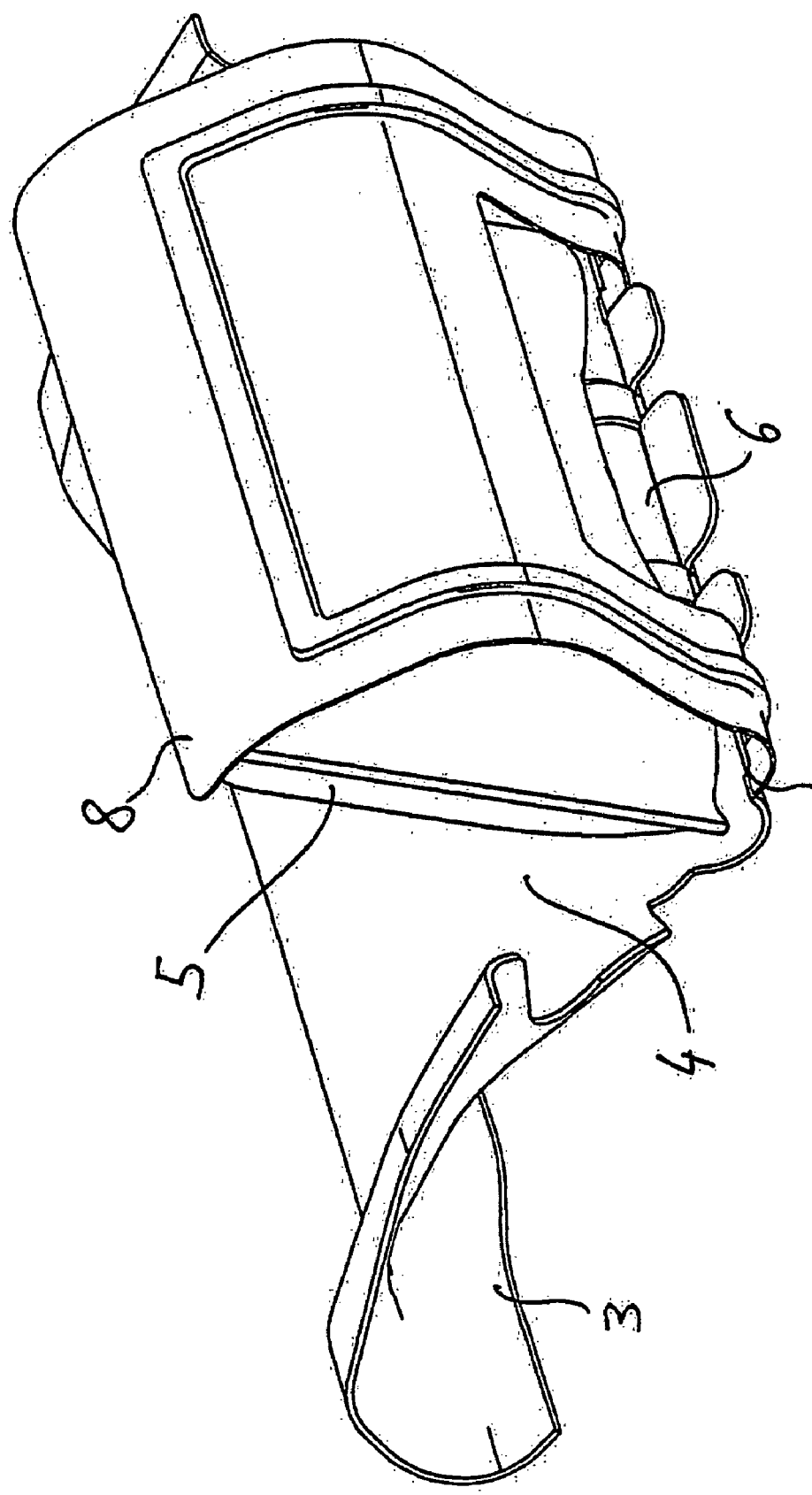
Figure 5:
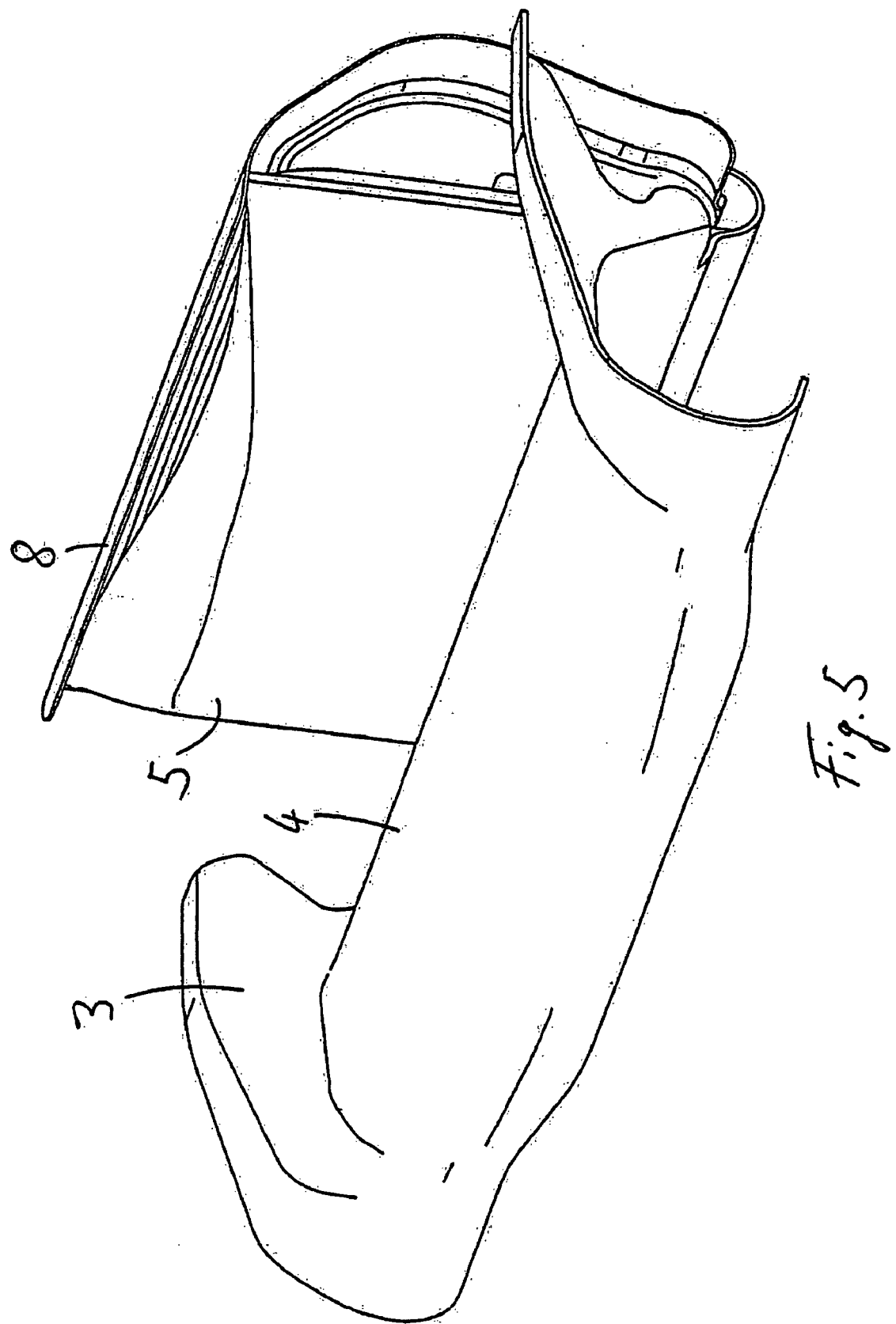
Figure 6:
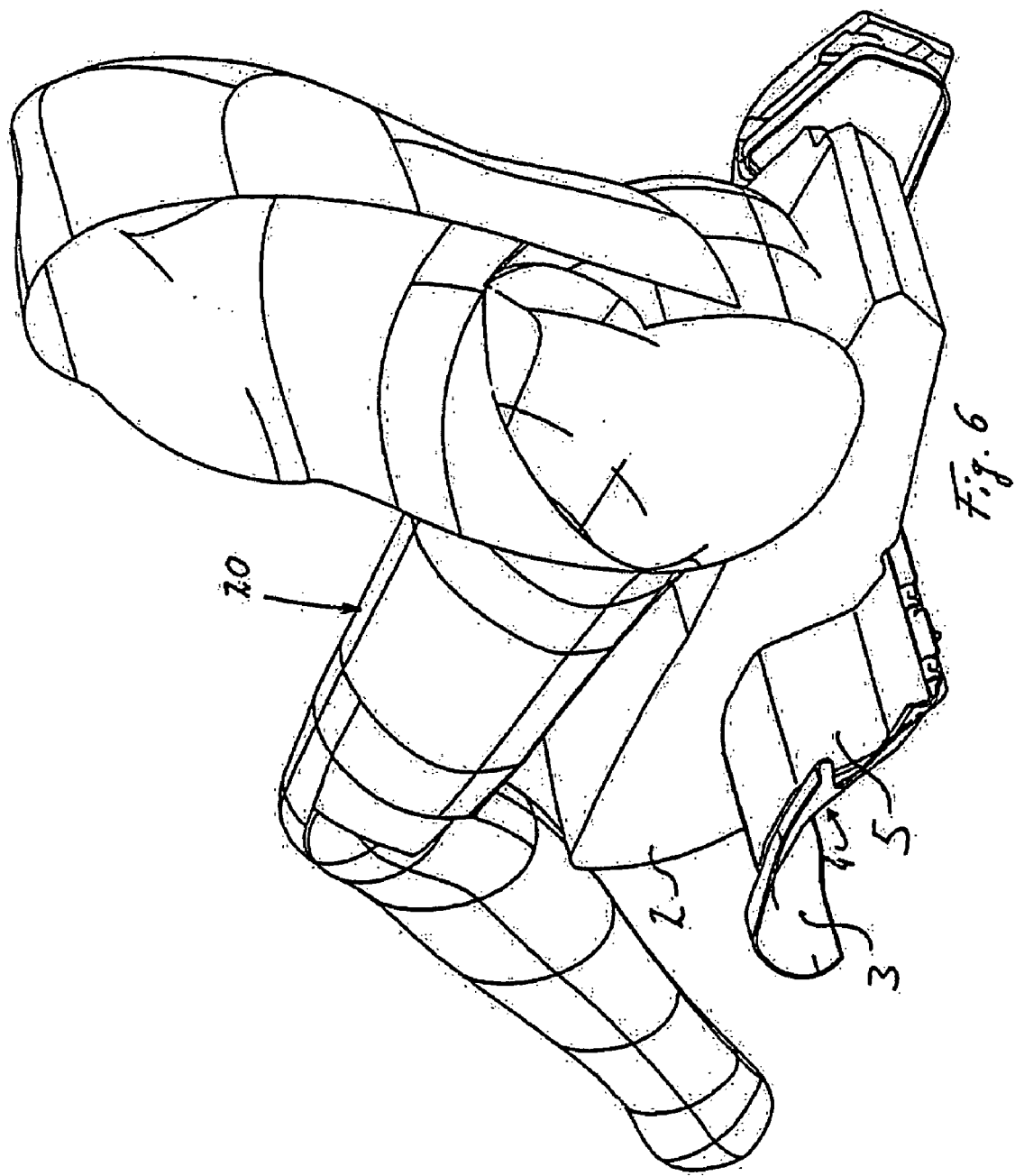
Figure 7:
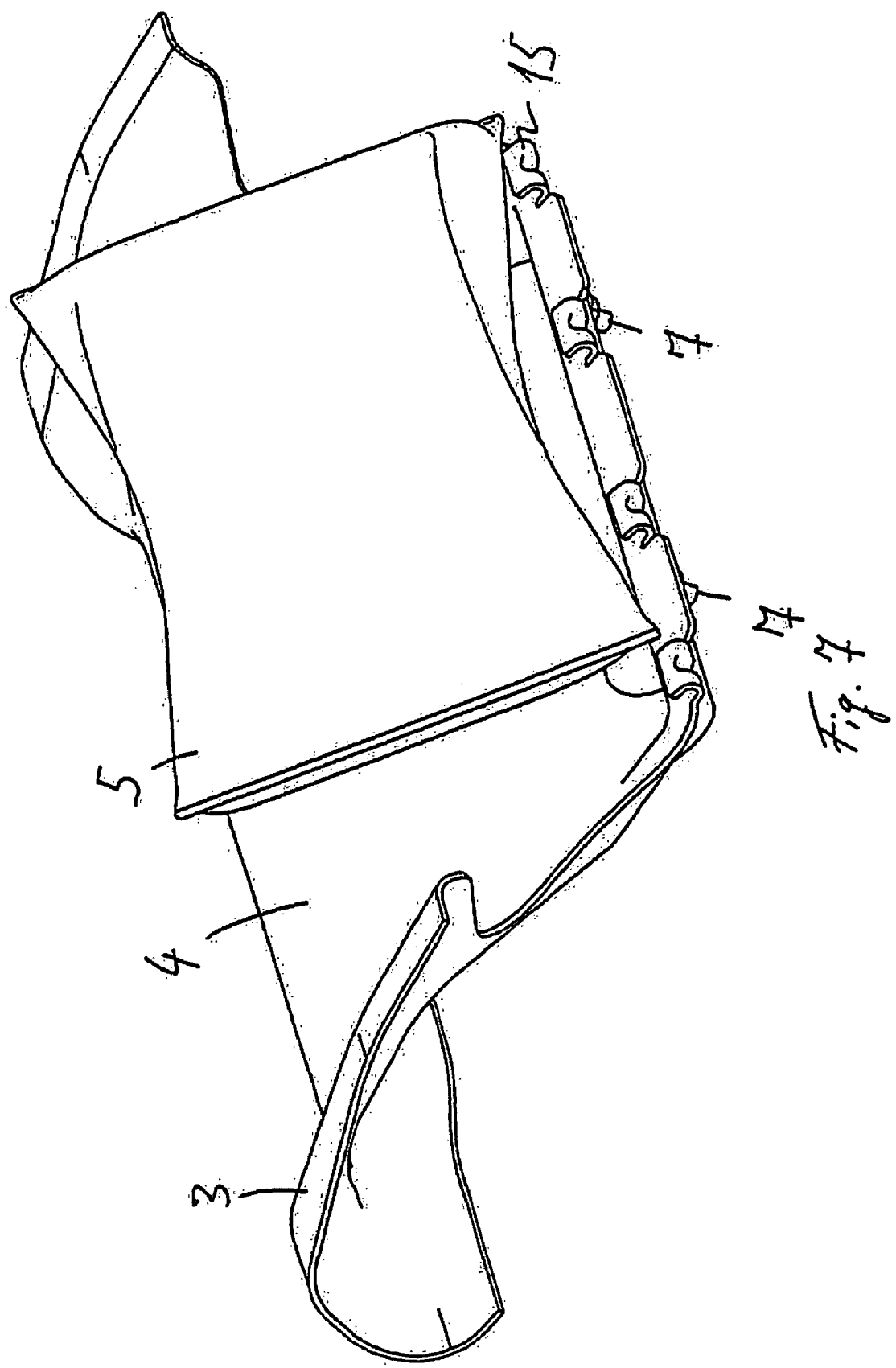
Figure 8:
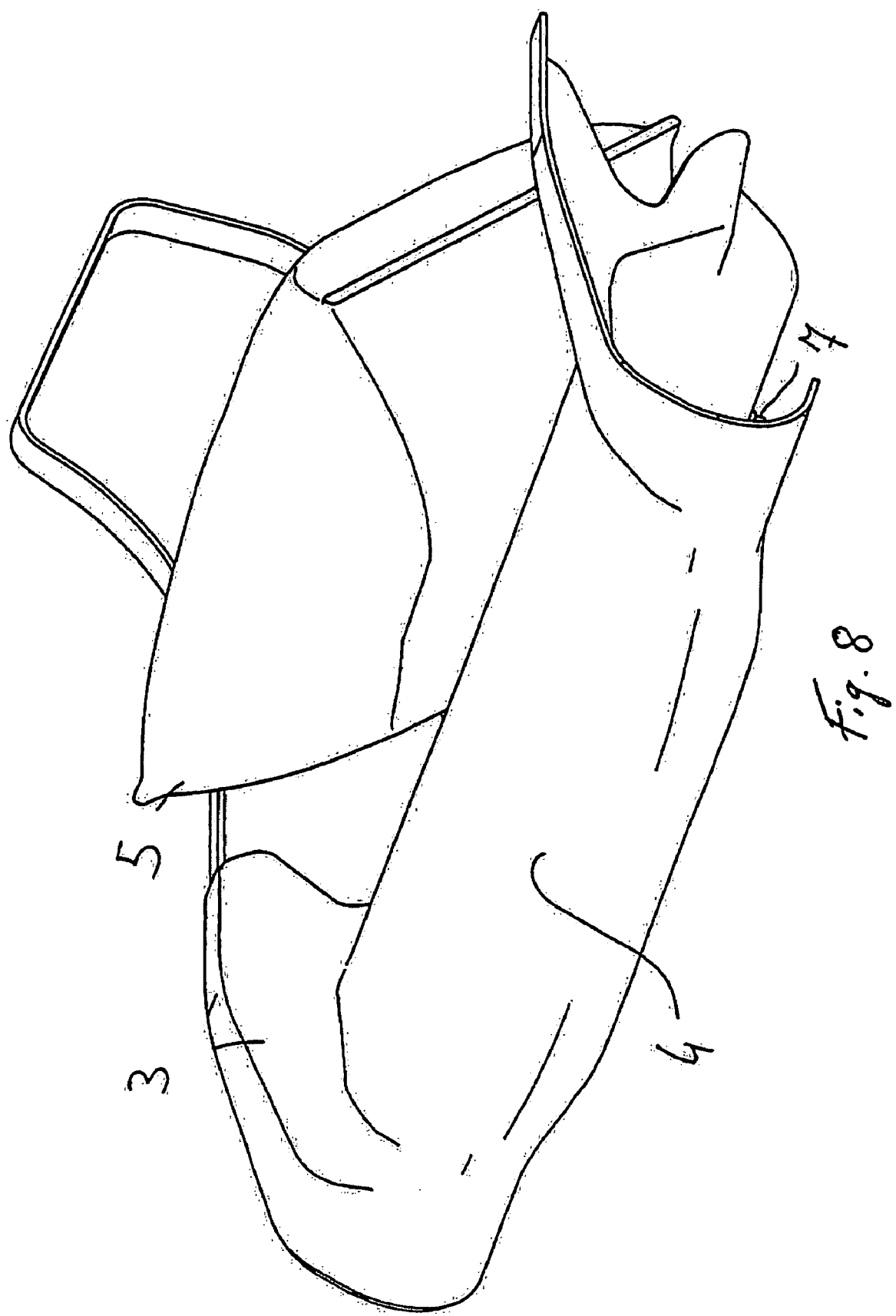

Exemplary embodiments of the invention are explained in more detail in the following by means of the enclosed Figures. Identical reference symbols in the Figures designate identical components. For the sake of clarity not all reference symbols are shown in all Figures. It shows:

FIG. 1—a schematic part sectional view through a vehicle seat;

FIG. 2—a bottom view of the seat cushion according to FIG. 1;

FIG. 3—a detail representation of a seat lower part;

FIG. 4—a seat lower part according to FIG. 3 with unfolded gas bag;

FIG. 5—a state according to FIG. 4 at an angle from the front;

FIG. 6—a variant of the invention;

FIG. 7—a gas bag in its unfolded position;

FIG. 8—a perspective view at an angle from the front; and

Figure 9:
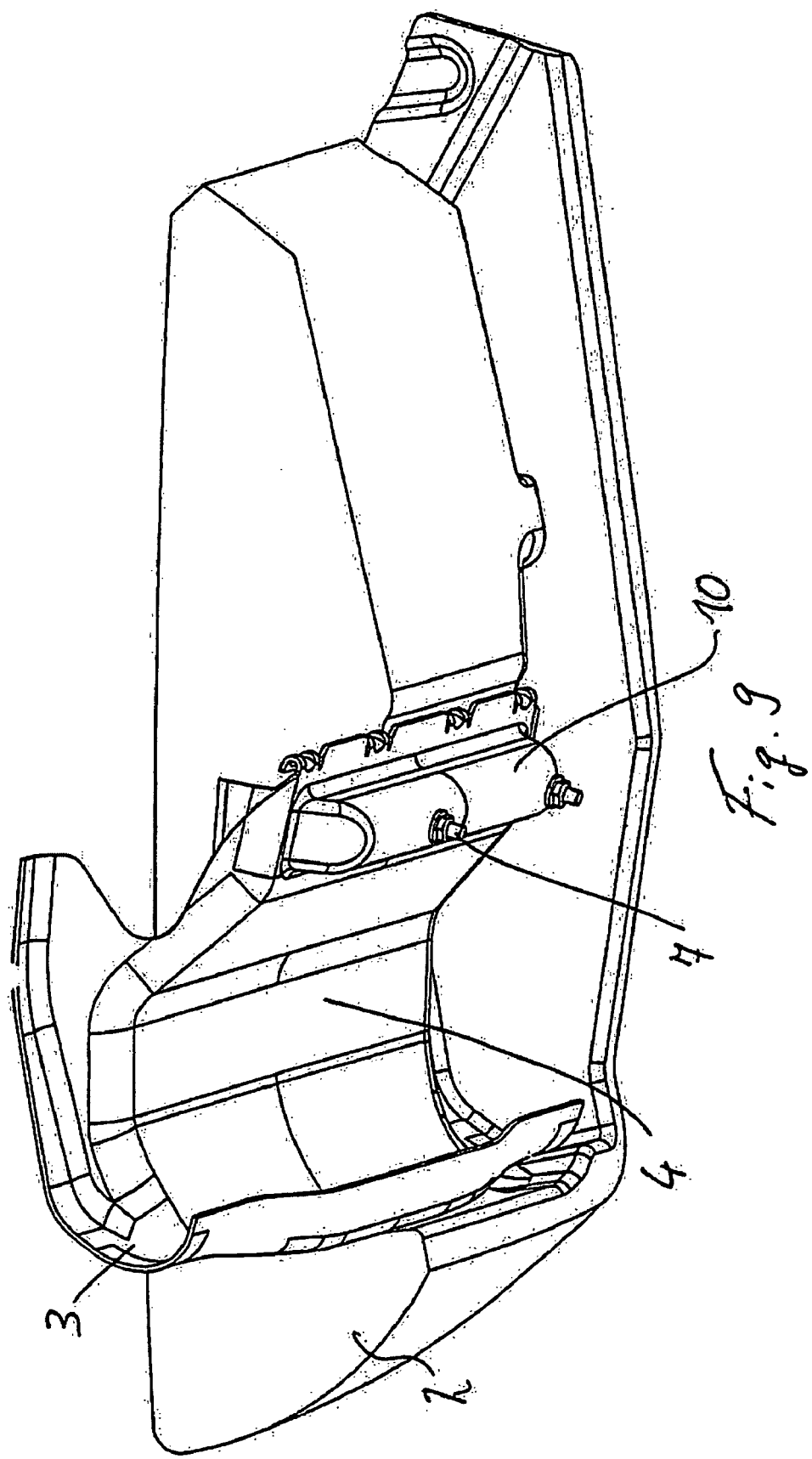
Figure 17:
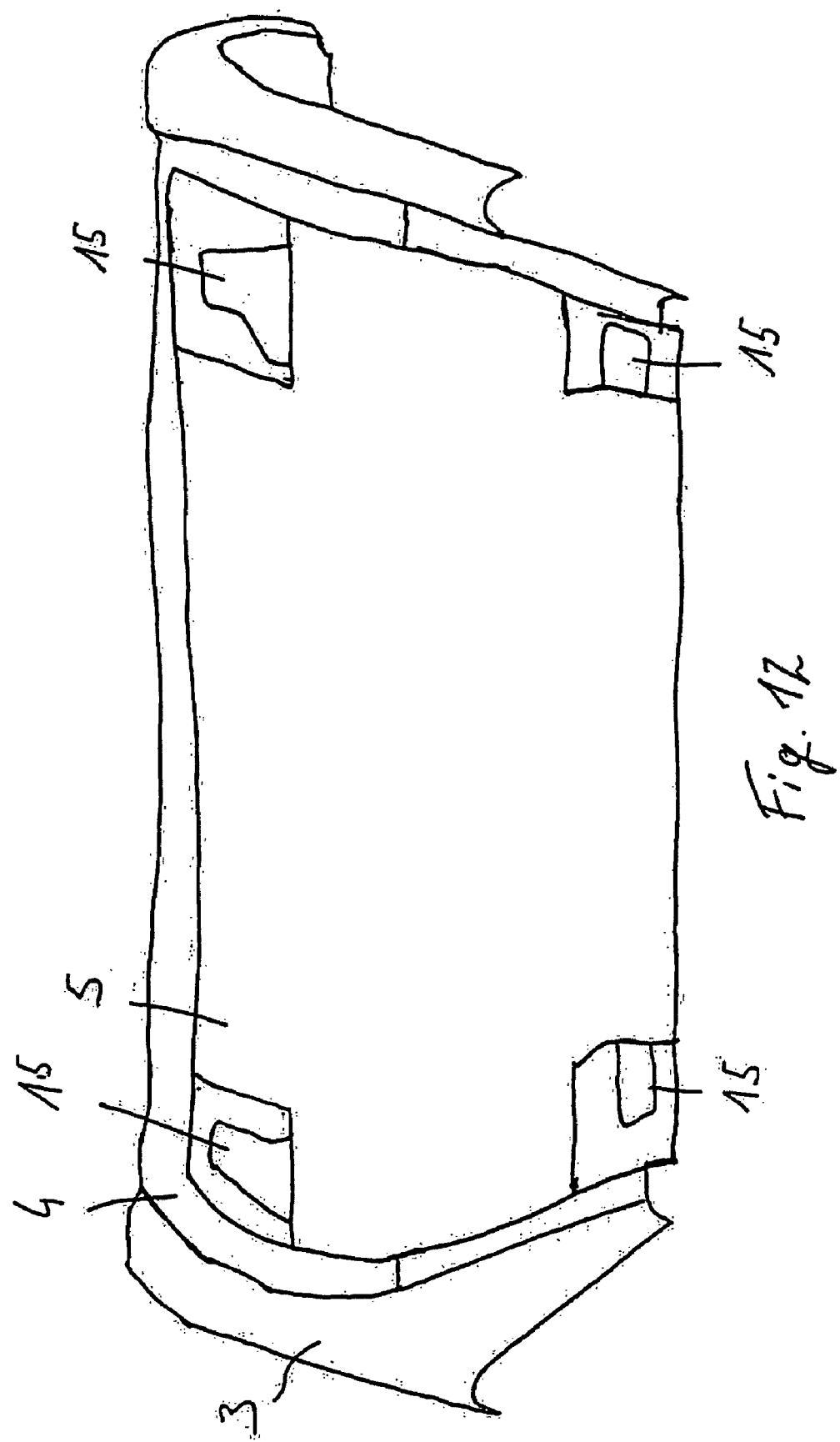

FIG. 9—a bottom view of the variant according to

FIGS. 6 to 8;

FIG. 10—a first variant of the attachment of the airbag;

FIG. 11—the airbag according to FIG. 10 in the inflated position;

FIG. 12—an alternative attachment of the airbag; and

FIG. 13—the airbag according to FIG. 12 in the inflated state.

FIG. 1 schematically shows a vehicle seat 1 without a backrest. On the vehicle seat 1 a seat user 20 is located who likewise is only partly shown schematically. The vehicle seat 1 comprises a seat cushion 2 which is attached to a seat frame 3. The seat frame 3 forms a bearing plate 4 or accommodates such a bearing plate 4 which extends in the front region of the vehicle seat 1 ascending in the direction towards the front seat edge. On this bearing plate 4, which preferably extends across over the entire seat width, a gas bag 5 is placed flat, which substantially extends over the entire seat width. The gas bag 5 can be operated with a pressure between 3 and 5 bar and is preferably designed as a single chamber gas bag. Here, the gas bag 5 can be embodied of two fabric cuttings which are sewn together via a circumferential seam or as a gas bag woven in one piece. The type of weave of the fibres of the fabric of the gas bag extends in and vertically to the driving direction and preferably crosses itself at a right angle.

The fabric is partly or completely coated in order to be resistant to a hot gas which is directed into the gas bag 5 from a gas generator 6 in the event of an accident. In addition to this, the coating can achieve an additional sealing effect.

Over the flat gas bag 5 a support plate 8 is embodied and arranged which substantially corresponds to the ascending contour of the bearing plate 4. The support plate 8 is connected with the seat frame 3 or with the bearing plate 4 via joint 9, for example a kind of film hinge or another joint. Both the bearing plate 4 as well as the support plate 8 form a housing 10 to accommodate the gas generator 6. Alternatively, the support plate 8 can be hooked in, placed upon or bent over. The support plate 8 may be biased toward the gas bag 5 as indicated by an arrow A in FIG. 1. More particularly, the support plate 8 may be preloaded in the direction of gas bag 5 with a torsion spring (not shown).

FIG. 2 shows the seat cushion of the seat 1 according to FIG. 1 in bottom view. The seat frame 3 with the bearing plate 4 directed upwards at an angle and the seat cushion arranged above the latter is evident as is the housing 10, which is embodied as part of the bearing plate 4 and the seat frame 3. Assembly flanges 14 serve for the attachment of the gas generator and the seat cushion.

FIG. 3 shows a detail representation of the seat substructure with the seat frame 3, the gas bag 5 arranged flat on the bearing plate 4 and the support plate placed over said gas bag. The gas bag 5 is attached to the gas generator 6 and is also held by the latter on the seat frame 3 and the bearing plate 4 in the event of inflation. As can be seen in FIG. 2 the gas generator is attached to the seat frame 3 and the bearing plate 4 embodied as one piece with the latter via attachment straps 7.

FIG. 4 shows the seat lower part according to FIG. 3 in the unfolded state of the gas bag 5. After an accident, a sensor signal was passed on to the gas generator via a control device which then either activated the stored pressure medium or the pyrotechnical propellant. After this, the gas bag 5 was inflated and the support plate 8 righted and displaced upwards. A lap of the seat user moving forward would in this state be pressed against the support plate 8. Sliding forward of the lap was effectively prevented as a result, similarly a submarining of the lap under a lap belt which is not shown.

In addition to the restraining effect of the righted support plate 8 and the lifting of the seat cushion 2 located thereupon, the support plate 8 also prevents the "submarining" with a non-activated gas bag 5 through the contouring which ascends towards the front. This applies also to a seat without an installed airbag. The support plate 8 is connected in an articulated manner with and supports the bearing plate 4 via the joint 9 and holds the gas bag 5 in the desired state following the activation. In addition to this, the support plate 8 forms a part of the housing as does the bearing plate 4.

Not depicted openings corresponding to the ventilation openings in the gas bag can be present in order to make a gas outlet possible.

FIG. 5 shows the state according to FIG. 4 from another view, namely at an angle from the front. In the non-activated state the gas bag 5 can be secured on the bearing plate 4, for example by hooking-in straps or buttons. The bearing plate 4 supports the gas bag 5 towards the bottom and at the same time provides the ramp function against the "submarining" in the non-activated state of the gas bag 5.

In FIG. 6 a variant of the invention is shown wherein the gas bag 5 rests flat on the bearing plate 4 while no support plate 8 covers the gas bag 5. The bearing plate 4 forms the housing for the gas generator which is not shown.

FIG. 7 shows the gas bag 5 in its unfolded position. By way of bent-over straps 15 the gas bag is held on the bearing plate 4 and the seat frame 3. Attachment stubs 7 project through the bearing plate 4 with which the gas generator can be secured.

A perspective view at an angle from the front is shown in FIG. 8, likewise without seat cushion and support plate 8.

FIG. 9 shows a bottom view of the variant according to the FIGS. 6 to 8. In this view, the moulded housing 10 is evident as is the screw attachment via attachment stubs 7, the arrangement of the bearing plate 4 inclined upwards in the direction of the front edge and the seat cushion 2 formed above the flat gas bag.

The gas generator 6 and the housing 10 are preferably arranged at the rear end of the gas bag 5 since this is where the greatest cushion thickness is present. The gas generator 6 can be directly assembled to the bearing plate 4 with or without a seam reinforcement of the gas bag 5.

Through the arrangement of the gas generator 6 at the rearward end of the gas bag, rolling-up of the gas bag 5 in the direction of the seat front end is avoided. The lap of the seat user is not directly contacted by the gas generator 6 so that damages to the lap through direct contact with the gas generator 6 must not be expected. In addition to this, the gas bag 5 is first inflated at the correct point, namely as closely as possible to the lap.

The gas generator is preferably arranged in the gas bag 5 before the sewing-up in order to avoid an expensive connection through special fastening means or a separate re-sewing. In addition to this, the stability of the gas bag is increased when the complete gas generator is located within the gas bag. The attachment bolts 7 project through the fabric of the gas bag 5. The control line for triggering the gas generator 6 can be passed through a ventilation opening in the gas bag 5.

FIG. 10 partially shows the vehicle seat with the seat frame 3 and the bearing plate 4 on which a gas bag 5 is attached. To prevent that the gas bag is not displaced in the uninflated position it is necessary to provide fastening means which fix the gas bag 5 on the bearing plate 4. These fastening means must take place in addition to the attachment which is provided by the gas generator which is not shown. In order to ensure a preferably flat and secure placement of the gas bag 5 on the seat frame 3 more preferably on the bearing plate 4 in the unfolded state and lying in one plane, attachment elements 11 in form of hooks or widenings on straps or bands are provided in the first embodiment of the invention at the four corners of the gas bag 5, which engage in openings 12 which are best evident in FIG. 11. The openings 12 are formed at the corners of the gas bag and make possible that the fastening means 11, for example hooks or the like, can be introduced in the openings or recesses 12. The part of the gas bag 5 in which the openings 12 are formed are not formed in the region which is filled with gas by the gas generator 6. If these openings 12 should be utilised as relief or ventilation openings, appropriate connection openings for the fluid connection with the inner volume of the gas bag 5 would have to be provided. The gas bag 5 rests flat and unfolded on the bearing plate 4.

When the gas bag 5 is filled and it unfolds as shown in FIG. 11, the fastening elements 11 or positive connection elements are released, in this case in that these are pulled or unhooked from the openings 12. The positive connection elements 11 or hooks are parts of a thin holding element 13, in this case of plastic, which rests flat on the surface of the bearing plate 4 where it is fixed, for example via an adhesive. The shape and size of the holding element 13 can also be embodied differently, likewise it can be attached on the bearing plate 4 or the seat frame 3 in a different manner, for example via rivets, positive connection elements or screws. While the flat embodiment of the uninflated gas bag 5 is ensured through the fastening elements 11, these do not or only immaterially so impair the unfolding of the gas bag 5 so that the desired antisubmarining function is guaranteed.

FIG. 12 shows a variant of the attachment of the uninflated gas bag 5 on the bearing plate 4. The attachment in this case is effected by way of stiff yet elastic plastic or metal tongues 15 arranged within the gas bag 5, which are shown in the partly cut-out gas bag 5. The tongues or straps 15 can be connected with one another and extend in the direction of the corners of the gas bag 5. Provided that the tongues 15 are combined into a component this can be attached to the gas generator or on the bearing plate 4 and, because of the preload, securely holds the corners of the gas bag 5 on the bearing plate 4 similar to a folding spring or dead centre spring. As soon as gas is directed into the gas bag 5 via the gas generator, this bag pulls together and bends the fixing elements or tongues 15 upwards which is shown in FIG. 13 in the right upper corner partly shown in sectional representation. Because of the flexible embodiment of the tongues 15 these bend upwards and allow inflating and enlarging of the gas bag volume in order to lift and stiffen the support plate and the seat cushion respectively.

As a matter of principle, other fastening possibilities are also provided to secure the gas bag 5 on the bearing plate 4 or on the seat frame 3 so that it remains fixed in the non-unfolded state. Here, gluing points, clip connections or other positive or elastic holders can be provided.

The invention claimed is:

1. A safety device in combination with a vehicle seat having a seat frame on which a seat cushion is attached, the safety device comprising:
   an airbag unit with a gas generator;
   a gas bag disposed below the seat cushion and on the seat frame, the gas bag in a nonactivated state rests flat on the seat frame; and
   a support plate covering at least one part of the gas bag in the non-activated state relative to the seat cushion, the support plate biased toward the gas bag.

2. A safety device in combination with a vehicle seat having a seat frame on which a seat cushion is attached, the safety device comprising:
   an inflatable gas bag disposed below the seat cushion and on the seat frame, the gas bag in a nonactivated state rests flat on the seat frame, the gas bag including an inflatable region and a non-inflatable peripheral region, the peripheral region including at least one attachment portion;
   a gas generator in fluid communication with a cavity of the gas bag and operative to deliver inflation gas to the cavity for inflating the gas bag; and
   a plurality of attachment elements extending through openings in the attachment portion of the peripheral region of the gas bag and interconnecting the gas bag to the vehicle seat, the openings spaced from the cavity of the gas bag;
   wherein the at least one attachment portion is releasable from the vehicle seat when the gas bag is inflated;
   wherein the attachment elements release the gas bag from the vehicle seat in resonse to inflation of the gas bag.

3. The safety device according to claim 2, wherein the seat frame includes a support and the gas bag rests on the support.

4. The safety device according to claim 3, wherein the support is formed plate-shaped and the gas bag rests on said support.

5. The safety device according to claim 2, wherein the gas generator is mounted on the seat frame.

6. The safety device according to claim 2, wherein the gas generator is mounted below the seat frame.

7. The safety device according to claim 2, wherein the gas generator is attached to the seat frame with at least one attachment bolt.

8. The safety device according to claim 2, wherein a support plate covers at least one part of the gas bag in the non-activated state relative to the seat cushion.

9. The safety device according to claim 8, wherein the support plate is part of the seat frame.

10. The safety device according to claim 8, wherein the support plate is folded in the direction of the gas bag.

11. The safety device according to claim 8, wherein the support plate is articulably mounted on the seat frame.

12. The safety device according to claim 2, wherein the seat frame forms a housing for the gas generator.

13. The safety device according to claim 12, wherein a support of the seat frame defines the gas generator.

14. The safety device according to claim 2, wherein the gas bag is a fabric gas bag.

* * * * *